United States Patent [19]
Grant et al.

[11] Patent Number: 5,687,232
[45] Date of Patent: Nov. 11, 1997

[54] ADJUSTABLE LENGTH TELEPHONE HANDSET

[76] Inventors: Sherri L. Grant; Thomas T. Grant, both of 12315 Tiger Creek La., Jacksonville, Fla. 32225

[21] Appl. No.: 605,723

[22] Filed: Feb. 22, 1996

[51] Int. Cl.⁶ .................................................. H04M 1/00
[52] U.S. Cl. ................................................ 379/433; 379/434
[58] Field of Search ........................ 379/433, 428, 379/434, 454, 455; 248/420, 429, 432, 223.41, 224.51, 157, 125.1, 124.1, 161

[56] References Cited

U.S. PATENT DOCUMENTS

| 4,225,265 | 9/1980 | Hooker et al. | 248/222.41 |
| 5,109,539 | 4/1992 | Inubushi et al. | 379/433 |
| 5,224,076 | 6/1993 | Thorp | 379/433 |

Primary Examiner—Jack K. Chiang

[57] ABSTRACT

An adjustable length telephone handset for permitting adjustment of the length of a telephone handset. The inventive device includes a telephone mouthpiece connected to a telephone earpiece by an adjustable handpiece assembly which supports the mouthpiece in an adjustable spacing relative to the earpiece to allow adjustment of the handpiece for both child and adult individuals.

1 Claim, 3 Drawing Sheets

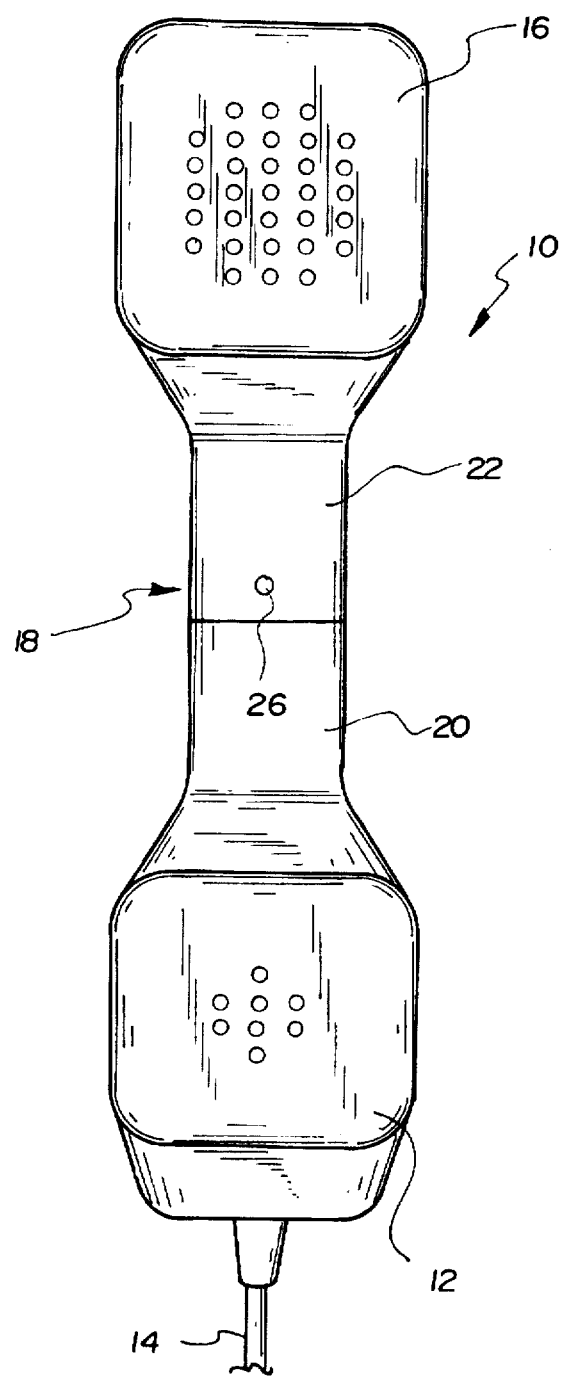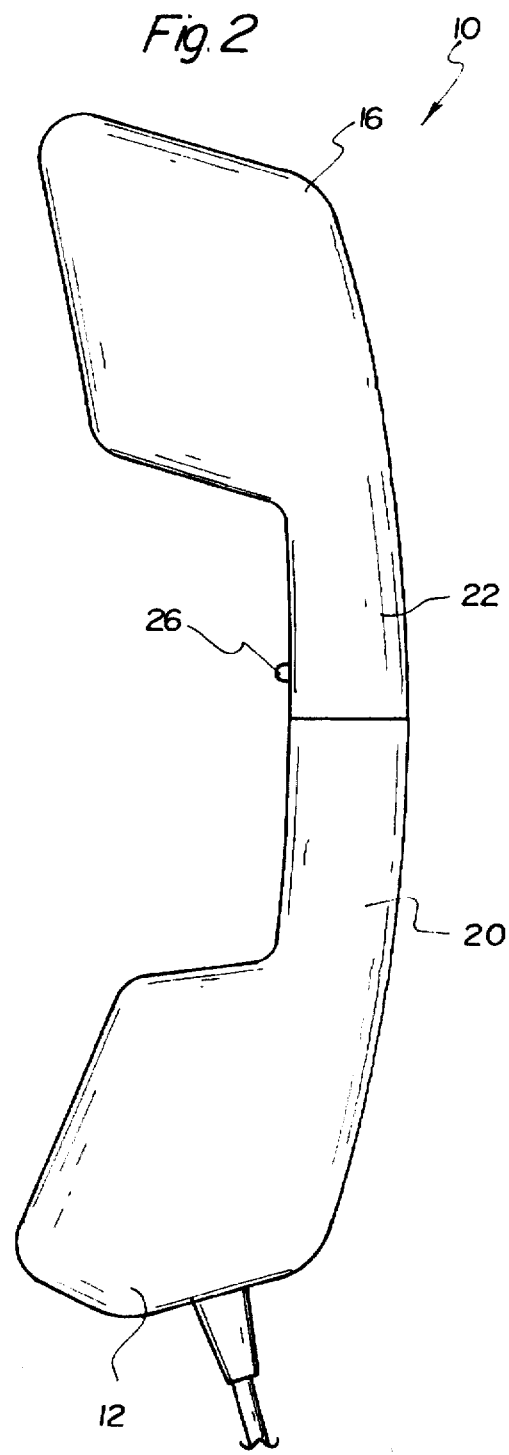

ADJUSTABLE LENGTH TELEPHONE HANDSET

BACKGROUND OF THE INVENTION

1. Field of the Invention

The present invention relates to telephones and more particularly pertains to a adjustable length telephone handset for permitting adjustment of the length of a telephone handset.

2. Description of the Prior Art

The use of telephones is known in the prior art. More specifically, telephones heretofore devised and utilized are known to consist basically of familiar, expected and obvious structural configurations, notwithstanding the myriad of designs encompassed by the crowded prior art which have been developed for the fulfillment of countless objectives and requirements.

Known prior art telephones include U.S. Pat. No. 5,335,274; U.S. Pat. No. 4,907,266; U.S. Pat. No. 5,197,091; U.S. Pat. No. 5,307,401; and U.S. Pat. No. 4,803,724.

While these devices fulfill their respective, particular objectives and requirements, the aforementioned patents do not disclose a adjustable length telephone handset for permitting adjustment of the length of a telephone handset which includes a telephone mouthpiece connected to a telephone earpiece by an adjustable handpiece assembly which supports the mouthpiece in an adjustable spacing relative to the earpiece to allow adjustment of the handpiece for both child and adult individuals.

In these respects, the adjustable length telephone handset according to the present invention substantially departs from the conventional concepts and designs of the prior art, and in so doing provides an apparatus primarily developed for the purpose of permitting adjustment of the length of a telephone handset.

SUMMARY OF THE INVENTION

In view of the foregoing disadvantages inherent in the known types of telephones now present in the prior art, the present invention provides a new adjustable length telephone handset construction wherein the same can be utilized for permitting adjustment of the length of a telephone handset. As such, the general purpose of the present invention, which will be described subsequently in greater detail, is to provide a new adjustable length telephone handset apparatus and method which has many of the advantages of the telephones mentioned heretofore and many novel features that result in a adjustable length telephone handset which is not anticipated, rendered obvious, suggested, or even implied by any of the prior art telephones, either alone or in any combination thereof.

To attain this, the present invention generally comprises a adjustable length telephone handset for permitting adjustment of the length of a telephone handset. The inventive device includes a telephone mouthpiece connected to a telephone earpiece by an adjustable handpiece assembly which supports the mouthpiece in an adjustable spacing relative to the earpiece to allow adjustment of the handpiece for both child and adult individuals.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new adjustable length telephone handset apparatus and method which has many of the advantages of the telephones mentioned heretofore and many novel features that result in a adjustable length telephone handset which is not anticipated, rendered obvious, suggested, or even implied by any of the prior art telephones, either alone or in any combination thereof.

It is another object of the present invention to provide a new adjustable length telephone handset which may be easily and efficiently manufactured and marketed.

It is a further object of the present invention to provide a new adjustable length telephone handset which is of a durable and reliable construction.

An even further object of the present invention is to provide a new adjustable length telephone handset which is susceptible of a low cost of manufacture with regard to both materials and labor, and which accordingly is then susceptible of low prices of sale to the consuming public, thereby making such adjustable length telephone handsets economically available to the buying public.

Still yet another object of the present invention is to provide a new adjustable length telephone handset which provides in the apparatuses and methods of the prior art some of the advantages thereof, while simultaneously overcoming some of the disadvantages normally associated therewith.

Still another object of the present invention is to provide a new adjustable length telephone handset for permitting adjustment of the length of a telephone handset.

Yet another object of the present invention is to provide a new adjustable length telephone handset which includes a telephone mouthpiece connected to a telephone earpiece by an adjustable handpiece assembly which supports the mouthpiece in an adjustable spacing relative to the earpiece to allow adjustment of the handpiece for both child and adult individuals.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational illustration of the preferred embodiment of the adjustable length telephone handset constructed in accordance with the principles of the present invention.

FIG. 2 is a side elevational view of the present invention.

Similar reference characters refer to similar parts throughout the several views of the drawings.

DESCRIPTION OF THE PREFERRED EMBODIMENT

Figure 3:
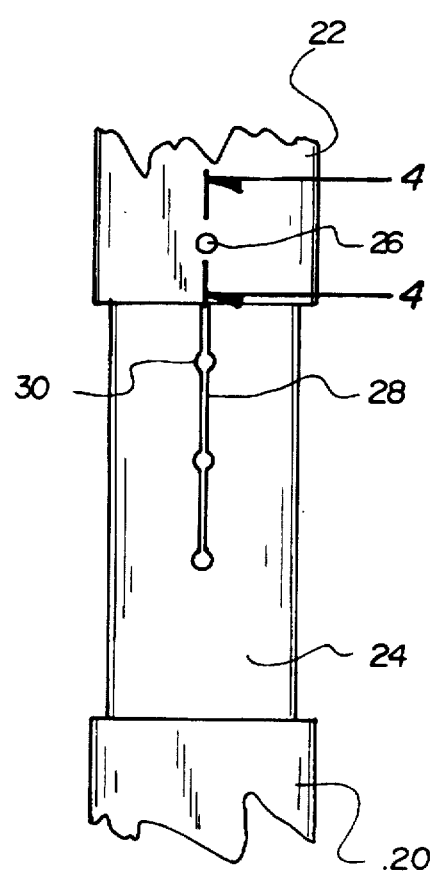
FIG. 3 is an enlarged front elevational view of an adjustable handpiece means of the invention.

With reference now to the drawings, and in particular to FIGS. 1-6 thereof, a new adjustable length telephone handset embodying the principles and concepts of the present invention and generally designated by the reference numeral 10 will be described.

More specifically, it will be noted that the adjustable length telephone handset 10 comprises a conventionally known telephone mouthpiece 12 which is electrically coupled to a telephone cord 14 extending to a telephone line or device. Although not illustrated for clarity, the cord 14 extends through the invention and is electrically coupled to a conventionally known telephone earpiece 16. The mouthpiece 12 and earpiece 16 serve to transmit and receive, respectively, audio sounds during the use of a telephone as is well understood. An adjustable handpiece means 18 extends between the mouthpiece 12 and the earpiece 16 to support the same in a spaced relationship such that manual manipulation of the handpiece means can cause the mouthpiece to be positioned proximal to the mouth of an individual utilizing an associated telephone while the earpiece is simultaneously positioned proximal to the ear of the individual. The adjustable handpiece means 18 can be manually adjusted to vary a distance between the mouthpiece and the earpiece so as to fit the telephone handset 10 to a particular individual such as a child or an adult.

Figure 4:
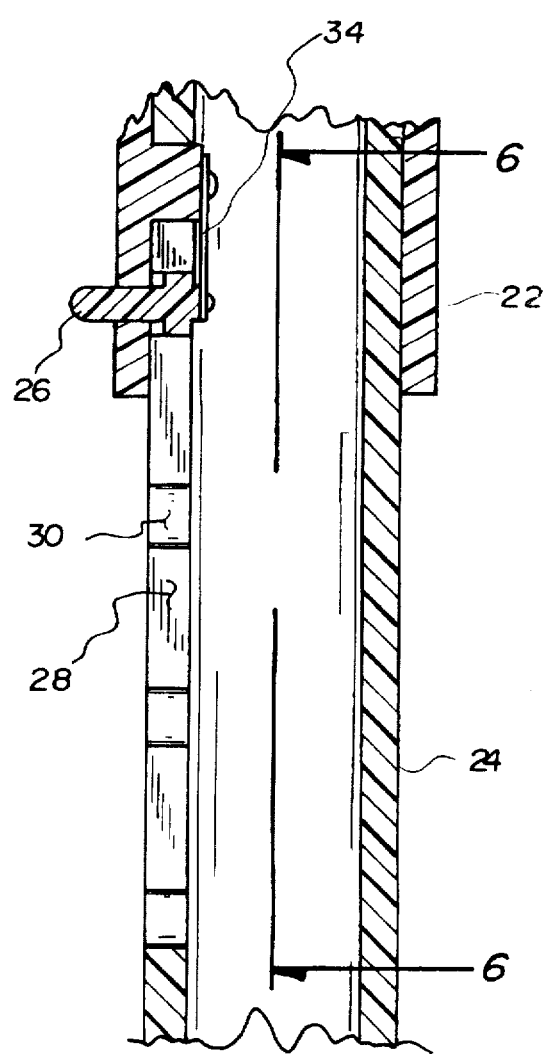
FIG. 4 is a cross sectional view taken along line 4—4 of FIG. 3.
Figure 5:
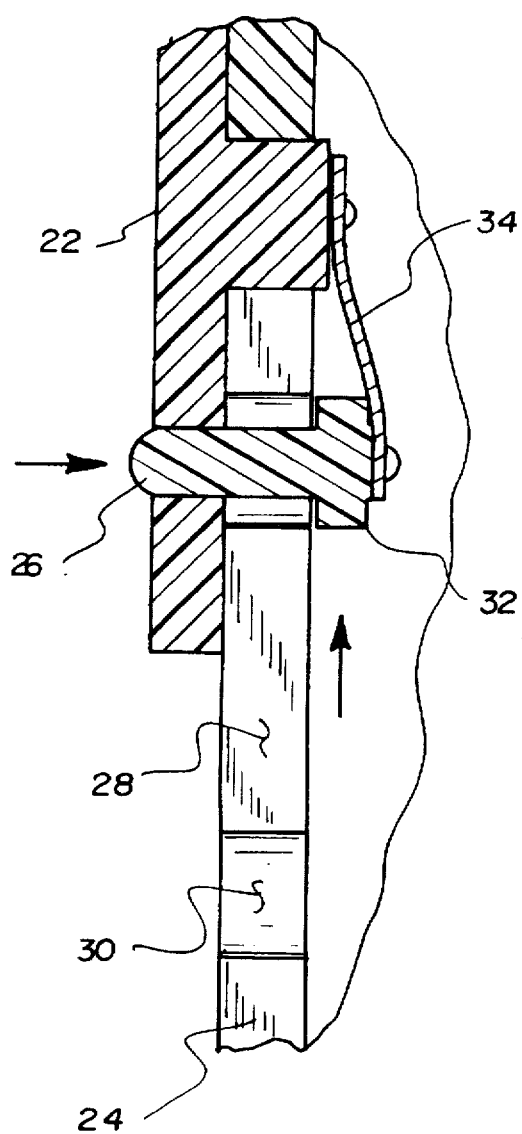
FIG. 5 is an enlarged cross sectional view of the adjustable handpiece means of the invention.
Figure 6:
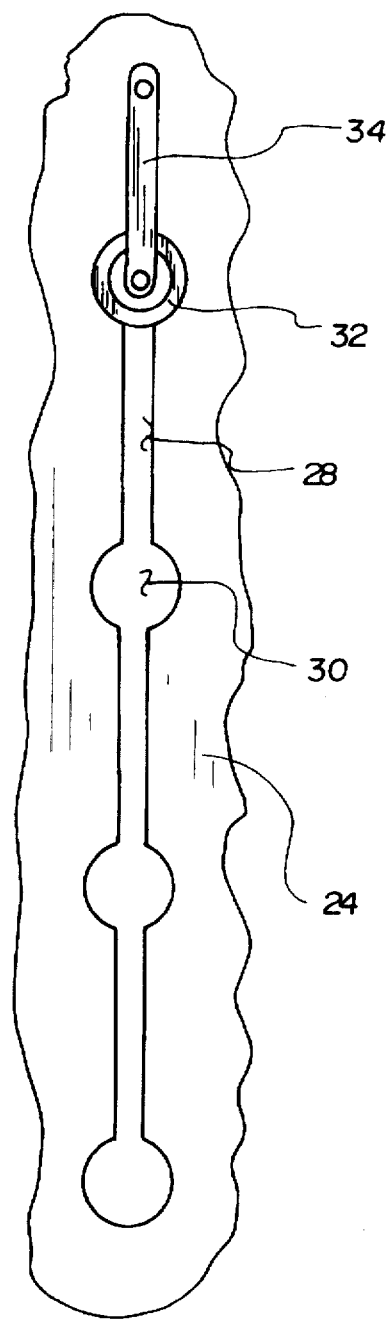
FIG. 6 is a rear elevational view taken from within the adjustable handpiece means along line 6—6 of FIG. 4.

As shown in FIGS. 1 and 2, the adjustable handpiece means 18 of the invention 10 includes a first handpiece portion 20 coupled to the mouthpiece 12 and a second handpiece portion 22 coupled to the earpiece 16. As shown in FIGS. 3 and 4, a connecting portion 24 is secured to the first handpiece portion 20 and is telescopingly received relative to the second handpiece portion 22. A push button 26 is mounted relative to the second handpiece portion and can be manually depressed to permit sliding of the connecting portion 24 relative to the second handpiece portion 22 to allow adjustment of the distance between the mouthpiece 12 and the earpiece 16. Release of the push button 26 will allow the adjustable handpiece means 18 to lock into one of a plurality of positions.

To this end, the adjustable handpiece means 18, as more specifically shown in FIGS. 3 through 6, further comprises a slot 28 formed into the connecting portion 24. A plurality of detent apertures 30 having a diameter greater than a transverse width of the slot are directed through the connecting portion 24 and centered in a spaced orientation along a longitudinal length of the slot 28. The push button 26 is slidably mounted within an aperture directed through the second handpiece portion 22 and is shaped so as to define an enlarged portion 32. The push button is of a diameter less than the transverse width of the slot 30, with the enlarged portion being of a diameter greater than the transverse width of the slot and less than the diameter of the detent apertures. A spring 34 is mounted to the enlarged portion 32 of the push button 26 and is coupled relative to the second handpiece portion 22 so as to normally maintain the enlarged portion 32 within one of the detent apertures. By this structure, a manual depression of the push button 26 will lift the enlarged portion 32 of the push button against a force of the spring 34 from one of the detent apertures to allow for sliding of the connecting portion 24 relative to the second handpiece portion 22. A release of the push button 26 will then allow the enlarged portion 32 to enter back into one of the detent apertures 30 when aligned therewith to secure the connecting portion 24 relative to the second handpiece portion 22. Thus, the adjustable handpiece means 18 allows the telephone handpiece 10 to be adjusted to closely fit the head of a child or like individual.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An adjustable length telephone handset comprising:
    a telephone mouthpiece being electrically coupled to a telephone cord extending to a telephone device;
    a telephone earpiece;
    an adjustable handpiece means extending between the mouthpiece and the earpiece for supporting the mouthpiece and the earpiece in a spaced relationship and for permitting a manual adjustment of a distance between the mouthpiece and the earpiece, the adjustable handpiece including a first handpiece portion coupled to the mouthpiece; a second handpiece portion coupled to the earpiece; a connecting portion secured to the first handpiece portion and telescopingly received relative to the second handpiece portion; and a push button mounted relative to the second handpiece portion and selectively engaged with the connecting portion, said push button can be manually depressed to allow adjustment of the distance between the mouthpiece and the earpiece;

the adjustable handpiece means further comprising a slot formed into the connecting portion; a plurality of detent apertures directed through the connecting portion and centered in a spaced orientation along a longitudinal length of the slot, the detent apertures each having a diameter greater than a transverse width of the slot, the push button being slidably mounted within an aperture directed through the second handpiece portion, the push button being shaped so as to define an enlarged portion, with the push button being of a diameter less than the transverse width of the slot, the enlarged portion being of a diameter greater than the transverse width of the slot and less than the diameter of the detent apertures; and a spring mounted to the push button and coupled relative to the second handpiece portion so as to normally maintain the enlarged portion within one of the detent apertures, whereby a manual depression of the push button will lift the enlarged portion of the push button against a force of the spring from one of the detent apertures to allow for a sliding of the connecting portion relative to the second handpiece portion, and a release of the push button will allow the enlarged portion to enter back into one of the detent apertures when aligned therewith to secure the connecting portion relative to the second handpiece portion.

* * * * *